United States Patent [19]
Bernhardt

[11] Patent Number: 5,318,698
[45] Date of Patent: Jun. 7, 1994

[54] ARRANGEMENT FOR CLEANING CONTAMINATED GROUND WATER

[75] Inventor: Bruno Bernhardt, Reutlingen, Fed. Rep. of Germany

[73] Assignee: IEG Industrie-Engineering GmbH, Betzingen, Fed. Rep. of Germany

[21] Appl. No.: 980,553

[22] Filed: Nov. 23, 1992

[30] Foreign Application Priority Data

Nov. 22, 1991 [DE] Fed. Rep. of Germany ....... 4138414

[51] Int. Cl.⁵ .............................................. C02F 1/00
[52] U.S. Cl. .................................. 210/150; 210/170; 210/901; 166/51
[58] Field of Search ............... 210/170, 185, 150, 151, 210/747, 901, 617, 618; 166/51, 276, 278, 311, 57, 61, 302

[56] References Cited

U.S. PATENT DOCUMENTS

| | | | |
|---|---|---|---|
| 2,911,047 | 11/1959 | Henderson | 166/61 |
| 3,343,605 | 9/1967 | Phelan, III | 166/61 |
| 3,548,935 | 12/1970 | Harkins | 166/51 |
| 4,253,947 | 3/1981 | Fan et al. | 210/618 |
| 4,322,296 | 3/1982 | Fan et al. | 210/618 |
| 4,419,243 | 12/1983 | Atkinson et al. | 210/618 |
| 4,438,000 | 3/1984 | Fan et al. | 210/807 |
| 4,917,183 | 4/1990 | Gaidry et al. | 166/278 |
| 4,950,394 | 8/1990 | Bernhardt | 210/170 |
| 5,082,053 | 1/1992 | Bernhardt | 166/311 |
| 5,116,163 | 5/1992 | Bernhardt | 210/170 |
| 5,143,606 | 9/1992 | Bernhardt | 210/170 |
| 5,183,110 | 2/1993 | Logan et al. | 166/51 |

FOREIGN PATENT DOCUMENTS

| | | |
|---|---|---|
| 0457261 | 11/1991 | European Pat. Off. . |
| 3612468 | 10/1987 | Fed. Rep. of Germany . |
| 3931012 | 4/1991 | Fed. Rep. of Germany . |
| 4001012 | 5/1991 | Fed. Rep. of Germany . |

OTHER PUBLICATIONS

J. Mutschmann & F. Stimmelmayr, "Taschenbuch der Wasserversorgung", Stuttgart, 1986, Chapter 3.2.4.4.1.

Primary Examiner—Christopher Upton
Attorney, Agent, or Firm—Michael J. Striker

[57] ABSTRACT

An arrangement for cleaning contaminated ground water and a ground region through which it flows comprises a shaft extending to a region of ground water to be cleaned, the shaft having a shaft wall with two water permeable wall regions located above and below a ground water level so that a separating region is formed in the shaft between the water permeable regions under the ground water level, a throughgoing passage extending through the separating region and ending above the ground water level in the shaft, a filter arranged in the shaft. The filter includes a pourable and fluid filter the throughgoing passage forms a part of a flow path. The circulating pump provides a ground water circulation which passes through the shaft, through the water permeable wall regions, through the surrounding ground region and through the filter arranged in the shaft. T he filter includes a pourable and fluid filter material which fills a shaft chamber located under the separating region. The throughgoing passage has a portion which is permeable for the ground water and not permeable for a filtering material and which extends into the filter material filling, and an additional passage extends through the separating region and provided for a pipe which passes from above for influencing the ground water or the fluid filter material.

6 Claims, 4 Drawing Sheets

ARRANGEMENT FOR CLEANING CONTAMINATED GROUND WATER

BACKGROUND OF THE INVENTION

The present invention relates to an arrangement for cleaning contaminated ground water.

More particularly, it relates to an arrangement which has a shaft extending to the region of ground water to be cleaned and provided with two separate water permeable regions located above and below a ground water level and a separating region therebetween, with a throughgoing passage extending through the separating region and ending above the the ground water level in the shaft.

Arrangements of the above mentioned general type are known in the art. One such arrangement is disclosed in the German patent DE-PS 3,931,012.

The German document DE-OS 3,612,468 discloses a filtering well in which a bore hole after removing the sand is filled with filter gravel.

SUMMARY OF THE INVENTION

Accordingly, it is an object of the present invention to provide an arrangement for cleaning contaminated ground water which is formed so that its application region is expanded and its handling is facilitated.

In keeping with these objects and with others which will become apparent hereinafter, one feature of the present invention resides, briefly stated, in an arrangement for cleaning contaminated ground water in which a shaft chamber located under the separating region is filled with a pourable and fluidizable filtering material, and a tubular throughgoing passage with a portion permeable for the ground water and not for the filtering material extends into the shaft chamber, and through the separating region at least one additional passage is provided for a pipe extending from outside for influencing the ground water or the fluidizable filtering material.

When the arrangement is designed in accordance with the present invention, the dangerous growth of the filter due to precipitation from the ground water, algae growth, etc. is avoided, since the pourable and fluidizable material is maintained in motion. This can be obtained due to the ground water flow produced by a circulating pump especially through the pipe which is guided through the additional passage in the separating region to the filter chamber. By intermittent introduction of pressurized air, a whirling of the total filter material filling is produced, so that the filter filling does not deposit and does not bake. The pressurized air can be supplied preferably through a nozzle body in the filter filling. The nozzle wall can downwardly limit the shaft chamber and air or another treatment gas as well as nutrient gas provided with nutrients for microbes can be supplied through an outwardly extending gas supply passage. The gas then rises through the filter material filling and through small openings formed in the separating region and in particular in a separating wall into the upper shaft chamber as long as it is not pulled into the flow path of the ground water.

The separating region which is required for forming an orderly ground water circulation can be formed in different ways, and by the selection of the means, special conditions at the site of the use can play a role. Thus, the separating region can be formed for example as a single separating wall which has throughgoing openings. In many cases it is sufficient to have a simple sieve wall which forms a flow resistance for the ground water and through which the gas can pass for additional gas treatment of the ground water in the shaft region. It suffices also to provide a separating region which is formed by at least partially compressed arrangement of the introduced filter material and thereby has a greater density than the ground region which surrounds the shaft and through which the ground water circulation takes place.

In accordance with the present invention the arrangement can be formed so that an exchange of the filtering material can be performed continuously or in predetermined time intervals, without interrupting the ground water circulation and dismounting the parts of the shaft inserts. For this purpose in the additional passage through the separating region, a suction pipe for sucking the filtering material can extend from outside to the bottom of the shaft region which is filled with the filter material, and also a supply pipes which ends closely underneath the separating region for supplying of the filtering material and its return together with the ground water sucking the filtering material can be inserted as well.

The application region and the operation efficiency of the arrangement can be further increased when in the water permeable shaft wall region which adjoins the filter material chamber the arrangement is provided with a water permeable heating casing which at least periodically warms up the ground water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
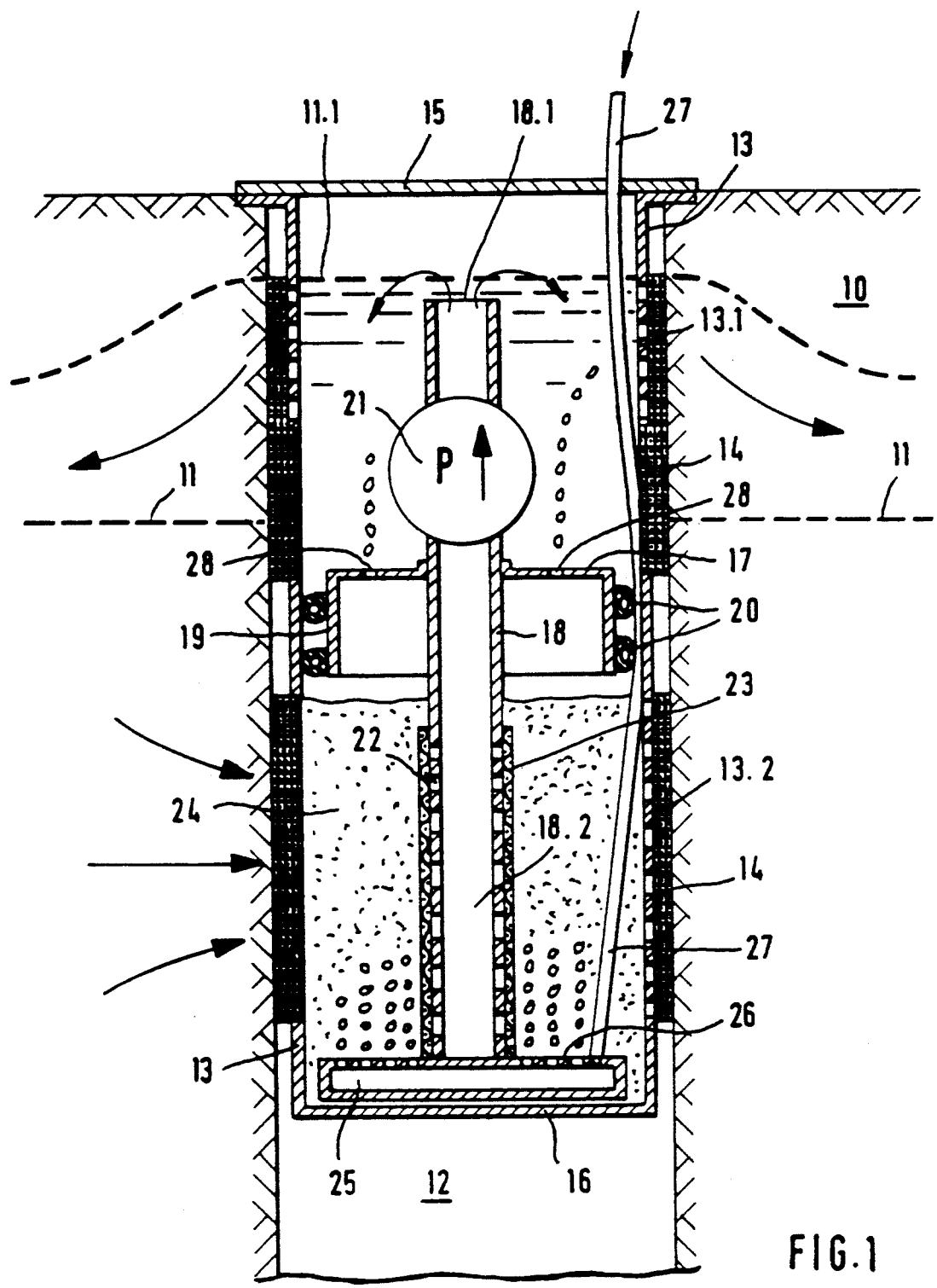
FIG. 1 is a schematic longitudinal section of an arrangement for cleaning contaminated ground water in accordance with a first embodiment of the present invention.

In all Figures similar parts of an arrangement for cleaning contaminated ground water are identified with the same reference numerals.

Reference numeral 10 identifies a contaminated ground region 10 which extends to a level 11 of the ground water. A shaft 12 is drilled in the ground region 10. The arrangement for cleaning inserted in the shaft 12 includes a tubular body 13 which has an upper water permeable wall portion 13.1 and a lower water permeable wall portion 13.2 which extend over the whole periphery of the tubular body 13. The water permeable wall portions can be formed by sieve pipe portions. In both shown embodiments these water permeable wall portions 13.1 and 13.2 are surrounded respectively with a sieve casing 14, composed of metal or synthetic plastic material. The sieve casing 14 prevents penetration of solid bodies into the interior of the tubular body 13. The tubular body 13 has an upper opening which is closed by a cover 13 and a lower end with a closed bottom 16.

A separating wall 17 is inserted in the tubular body 13 under the ground water level 11. In the shown embodiment the separating wall is formed by the bottom of a cup-shaped insert member 19 provided on its outer surface with two inflatable clamping hoses 20. The hoses can be inflated so as to hold the separating wall 13 at the desired location. The separating wall 17 has a central opening. A tubular throughgoing passage 18 is inserted in the central opening and has an upper opening 18.1 above the normal ground water level 11 in the region of the upper water permeable wall portion 13.1 of the tubular body 13. An electrically operated circulating pump 21 is arranged inside the throughgoing passage 18. A portion 18.2 of the tubular throughgoing passage which is located under the separating wall 17 is provided with throughgoing openings 22 over its greater part and is surrounded with a wound net filter 23. The filter limits the permeability of the lower region of the through-going passage to liquids and gases and prevents the penetration of pourable and fluidizable filtering material 24. The filtering material fills an inner chamber of the tubular body 13 which is located under the separating wall 17.

A flat nozzle body 25 is mounted on the lower end of the tubular throughgoing passage 18. Its upper limiting wall is formed as a nozzle wall and is connectable with a not shown gas source through a hose conduit 27 which extends along the shaft wall through the shaft cover 25 outwardly. The nozzle body 25 can also be provided at its periphery with an inflatable clamping hose 20. In this case, the bottom 16 of the tubular body can be dispensed with, and a longitudinal displaceability of the shaft insert part composed of the separating wall 17, the throughgoing passage 18 and the nozzle member 25 is possible within any region for adjusting to an alternating ground water level 11.

When the circulating pump 21 is operated, the ground water which flows through the wound net filter 23 and the openings 22 into the lower part 18.2 of the throughgoing passage 18 is supplied through the separating wall 17 into the upper shaft region and thereby the ground water is aspirated from the surrounding ground region 10 through the lower water permeable wall portion 13.2 into the filter material filling 24 located in the lower tubular body region. The upwardly supplied ground water forms in the tubular body 13 a raised water level 11.1 and flows through the upper water permeable wall region 13.1 of the tubular body 13 again into the surrounding ground region 10. The air which is supplied through the hose conduit 27 into the nozzle body 25 or another treatment gas passes through the nozzle wall 26 into the filter material filling 24, is entrained partially by the throughflowing ground water in the throughgoing passage 18 or exits through small openings 28 in the separating wall 17 into the upper part of the tubular body 13. The gas can be used for treatment of the ground water, for additional driving out of volatile impurities from the ground water or for supplying of microbes available in the filter material filling. However, it is used in particular for moving the filter material filling so that it cannot form deposits. Due to the periodical introduction of the pressurized air into the nozzle body 25 a very strong whirling of the total filter material filling is obtained.

Figure 2:
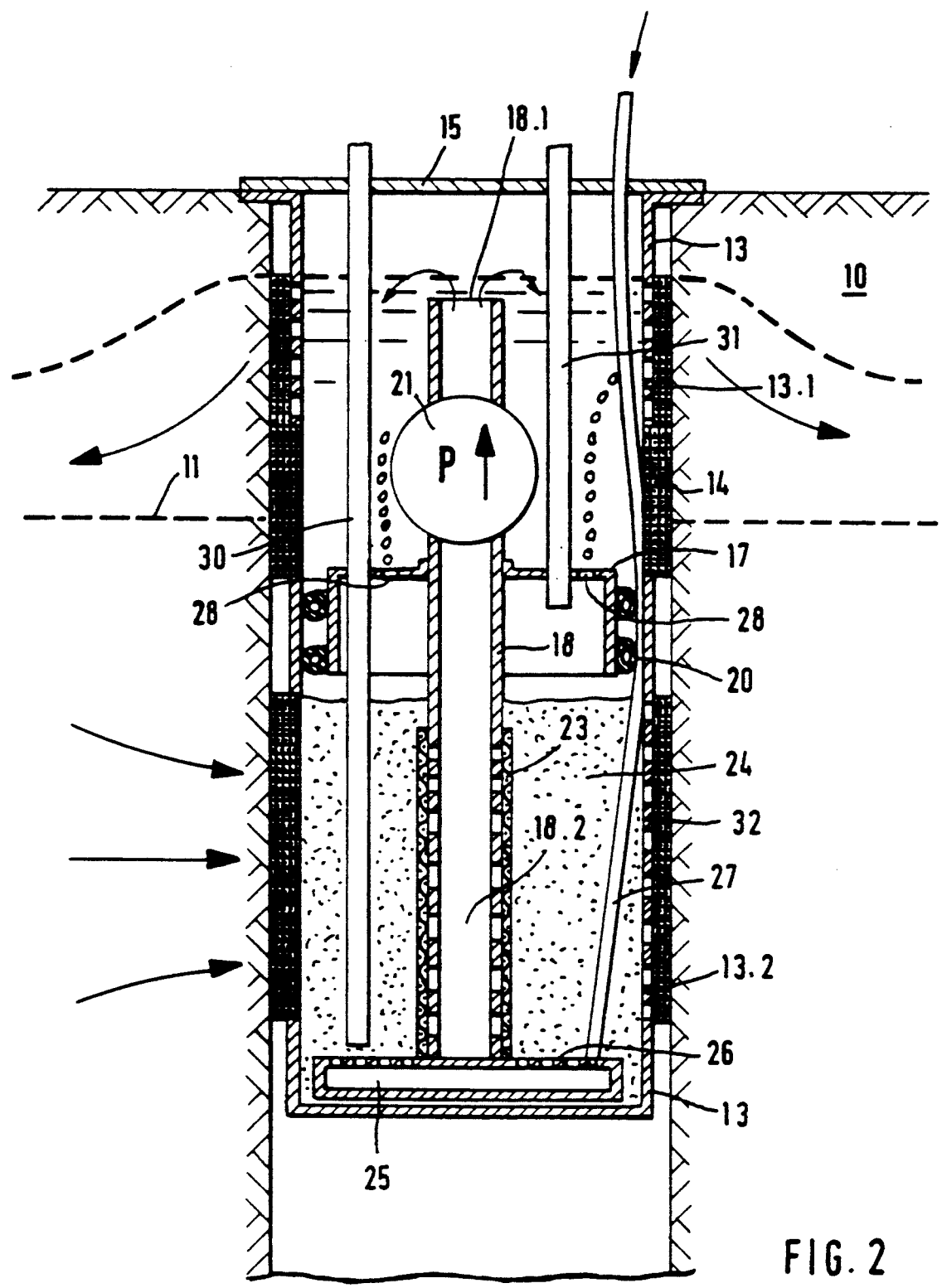
FIG. 2 is a view substantially corresponding to the view of FIG. 1 but showing a second embodiment of the present invention.

The arrangement in accordance with the embodiment shown in FIG. 2 differs from the arrangement of FIG. 1 by an additional suction pipe 30. The suction pipe extends from outside through the cover 15 and the inner separating wall 17 into the bottom region of the tubular body 13, until the region before the nozzle wall 26 of the nozzle body 25. Moreover, an inlet pipe 31 extends from outside through the cover 15 and the separating wall 17 and ends closely under the separating wall 17. By a not shown suction device which forms a part of a filter regeneration device, the pourable and fluidizable filtering material of the filter material filling 24 can be aspirated through the suction pipe 30 from the tubular body. Through the inlet pipe 31 the ground water which is removed together with it can be supplied back into the shaft and new or regenerated filtering material can be filled in the shaft. Therefore a continuous suction and filling of the filter material is possible.

In the embodiment of FIG. 2 a water permeable heating casing 32 is arranged on the lower water permeable wall region 13.2 of the tubular body 13. It is, for example, periodically and electrically heatable and serves for warming up of the flowing-in ground water in order to increase the cleaning action.

In the above described arrangement, the clamping hoses 20 provide complete sealing of the separating wall 17 against the wall of the tubular body 13. However, it is not necessarily required. The separation wall 17 can be held in the tubular body 13 by another, less tight means.

Figure 3:
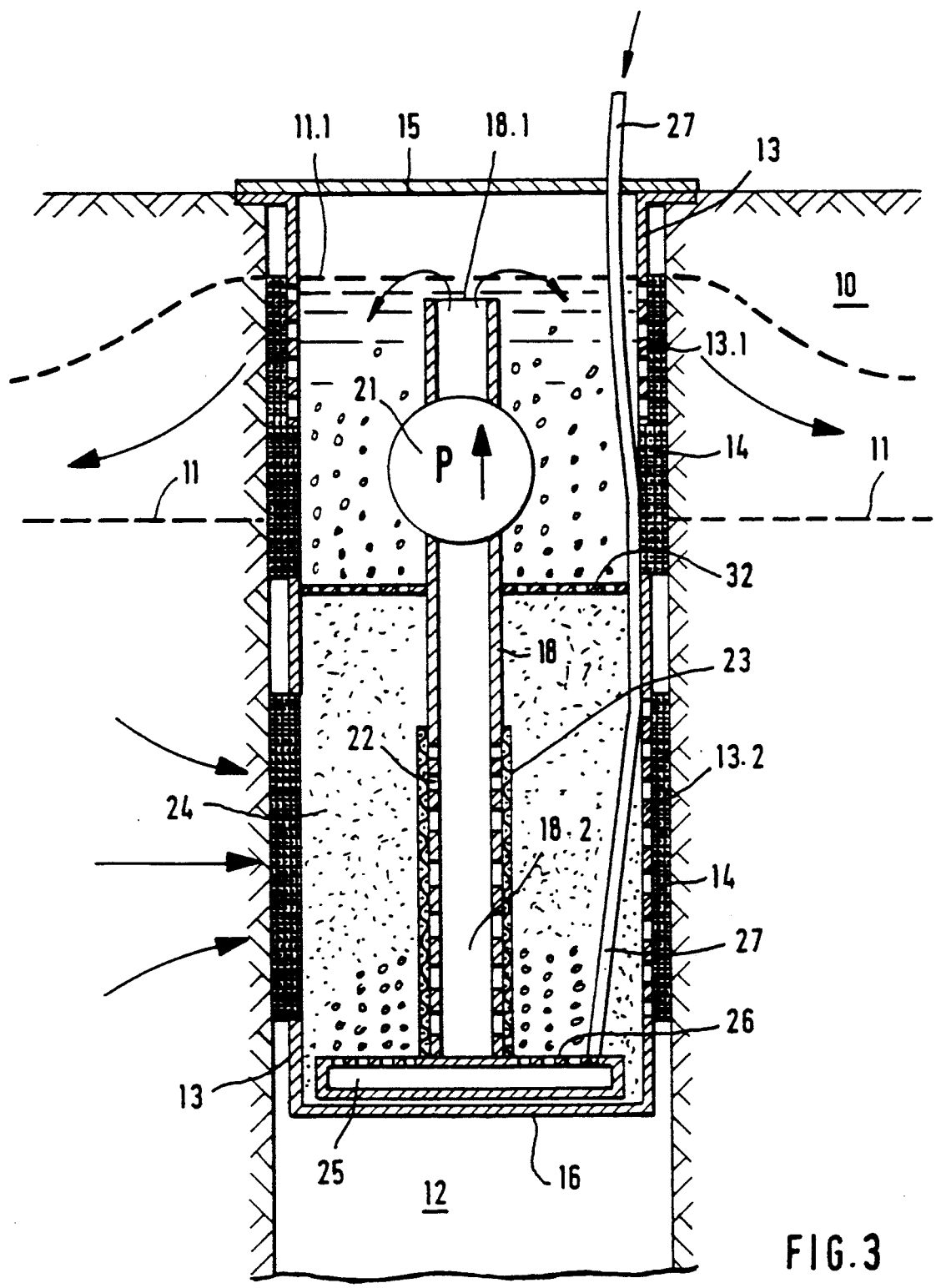
FIG. 3 is a view substantially corresponding to the view of FIG. 1 but showing a third embodiment of the present invention.

In the embodiment of FIG. 3 the separating wall 17 is replaced with a simple sieve wall 33. The sieve wall is not sealed against the shaft wall. Depending on the applications, it can be mounted on the tubular throughgoing passage 18 or placed loose on the filter material filling 24. The sieve wall 33 through which treatment gas and a ground water part can pass upwardly, forms a flow resistance for the ground water which is greater than in the remaining ground water circulating region. It is therefore guaranteed that the coarse parts of the ground water which is forced in a circulation flows in the desired manner through the filter material filling 24 into the throughgoing passage 18.

Figure 4:
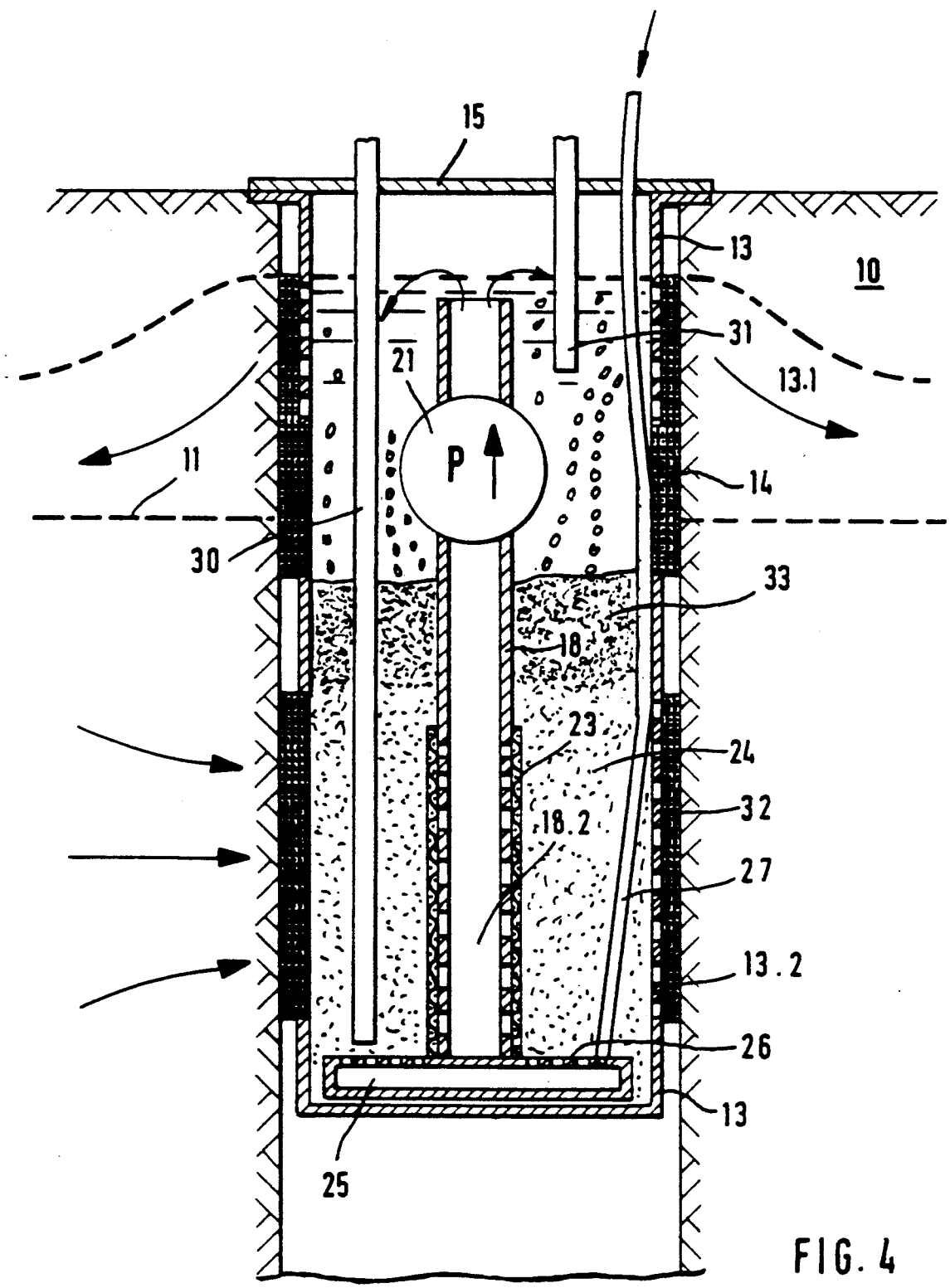
FIG. 4 is a view substantially corresponding to the view of FIG. 1 but showing a fourth embodiment of the present invention.

In the embodiment of FIG. 4 a separating wall is completely dispensed with, and the separating region is formed by a compressed upper layer 34 of the filter material filling 24. In this case the inlet pipe 31, in contrast to the embodiment of FIG. 2, and above the separating region, since no wall preventing an introduction of pourable and fluidizable filter material is available. The compressed filter layer 34 can be formed by tools which pass through the upper opening of the tubular body or by hydraulic or pneumatic pressure, so as to provide in this separating region the density of the filter material which is higher than in the surrounding ground region.

It will be understood that each of the elements described above, or two or more together, may also find a useful application in other types of constructions differing from the types described above.

While the invention has been illustrated and described as embodied in an arrangement for cleaning contaminated ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for cleaning contaminated ground water and a ground region through which it flows, comprising a shaft extending to a region of ground water to be cleaned, said shaft having a shaft wall with two water permeable wall regions located above and below a ground water level and a separating region formed in said shaft between said water permeable regions under the ground water level; a throughgoing passage extending through said separating region and ending above the ground water level in said shaft; a filter arranged in said shaft; a circulating pump arranged in said shaft and connected with said throughgoing passage, said circulating pump providing a ground water circulation which passes through the surrounding ground region, through said water permeable wall regions of said shaft, and through said filter arranged in said shaft, said filter including a pourable and fluidizable filter material which fills a shaft chamber located under said separating region; a nozzle member having a nozzle wall which limits from below said shaft chamber which is filled with said filter material, said throughgoing passage having a portion which is permeable for the ground water and not permeable for the filter material and which extends into said filter material; and an additional gas supply passage extending through said separating region and supplying gas for influencing the ground water and the fluidizable filter material, said gas supply passage ending in said nozzle member and extending through said shaft and through said separating region outwardly; a suction pipe extending through an additional passage of said separating region from outside to a bottom of a shaft region which is filled with the filtering material and provided for aspirating of the filtering material; and an inlet pipe which ends closely underneath said separating region for supplying said filtering material and returning the ground water aspirated together with said filtering material into said shaft.

2. An arrangement as defined in claim 1, wherein said gas supply passage is connectable with a pressurized air source.

3. An arrangement as defined in claim 1, wherein said separating region is formed as a single separating wall provided in said shaft and having a plurality of throughgoing openings.

4. An arrangement as defined in claim 1, wherein said separating region is formed as a sieve wall arranged in said shaft and providing a flow resistance.

5. An arrangement as defined in claim 1, wherein said separating region is formed by at least one partially compressed portion of said filtering material.

6. An arrangement as defined in claim 1, wherein at least one of said water permeable wall regions adjoins said shaft chamber filled with said filtering material; and further comprising a water permeable heating casing provided on said at least one water permeable wall region.

* * * * *